Patented Feb. 10, 1953

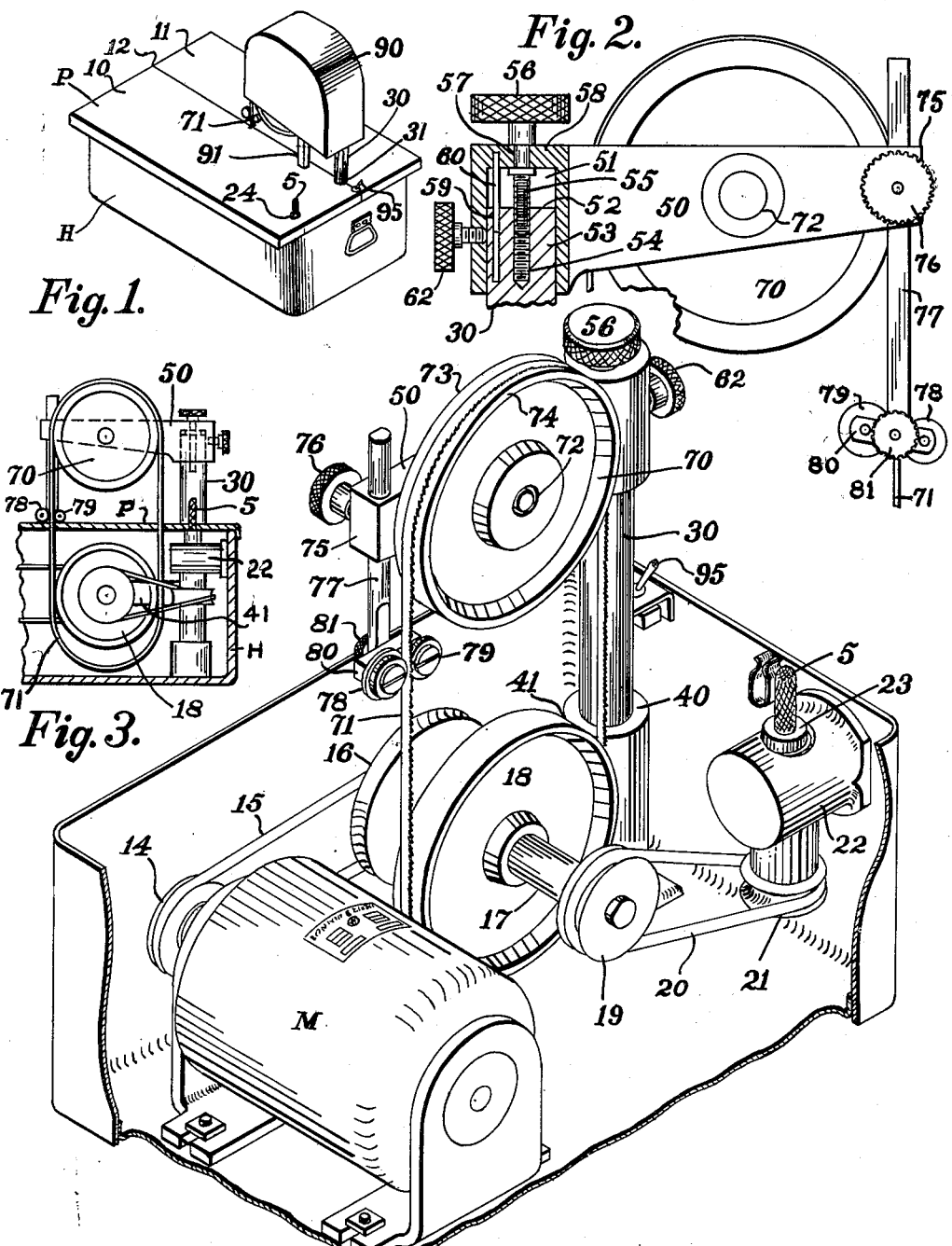

2,627,881

UNITED STATES PATENT OFFICE 2,627,881

BAND SAW AND GUIDE THEREFOR

Ralph J. Houtte, North Andover, and Russell E. Schwarzenberg, Methuen, Mass.

Application July 18, 1949, Serial No. 105,330

1 Claim. (Cl. 143—17)

This invention relates to a band saw combined with a shaper tool on the same work platform in such a way that the operator can use either saw or shaper at will.

The motor and operating pulleys of our saw and shaper are confined in a housing beneath the work platform. One of the objects of the device is to permit the use of either saw or shaper without danger of injury from the tool not being used and without the necessity of opening the housing to change to one tool from the other.

A further object of our device is to provide a compact portable band saw mechanism with an improved apparatus for mounting the upper pulley and blade guides which also functions as a brake and release for the band saw blade when the shaper tool is in use.

In the drawings,

Fig. 1 is a perspective view of our new band saw.

Fig. 2 is an elevation, partly in section, of the upper pulley carrying arm of the band saw.

Fig. 3 is a fragmentary elevation, in section, illustrating the manner in which the band saw blade of our device is stopped when the shaper tool is in use, and Fig. 4 is a perspective view sectionalized to show the relation of the parts of our device.

In Fig. 1, H is the housing and P, the work platform of our device, the platform P being split into two portions 10 and 11, meeting at the line 12. Within housing H is an electric motor M having a pulley 14 connected by a belt 15 to a pulley 16 on a shaft 17 mounted transversely of the housing. The lower band saw pulley 18 is fixed to shaft 17 and the shaft also carries a pulley 19 connected by a belt 20 to a pulley 21 on shaper tool holder 22.

The shaper tool 5 is removably mounted in any suitable manner in a tool socket 23 in 22 and socket 23 is directly beneath a hole 24 in the part 10 of work platform P.

An upright cylindrical post 30 is fixed within the housing H and projects through a hole 31 in platform P to a point above the platform. Sleeve 40, a lower horizontal arm 41, is mounted on post 30, beneath platform P, and shaft 17 is journalled in the end of arm 41.

We provide an upper horizontal arm 50, having an inverted cylindrical socket 51, at one end, which fits over the top 52 and upper portion 53 of post 30. A threaded recess 54 is provided preferably in the centre of the top 52 for engagement with a threaded stem 55 of adjusting screw 56, the adjusting screw 56 being revoluble in a hole 57 in the base 58 of socket 51. A non-threaded recess 59 is also provided in top 52 for engagement with a depending rod 60 fixed in the base 58 of socket 51. Rod 60 prevents the arm 50 from rotating about post 30 when screw 56 is turned and also acts as a guide in installing the socket on post 30. A set screw 62 mounted in the side wall of the socket and bearing against post 30 may also be used to lock the parts in position.

The upper cone pulley 70 for band saw blade 71 is revolubly mounted at 72, intermediate of arm 50, and directly above the lower cone pulley 18. Both pulleys are of greater diameter on one side 73 than on the other side 74 so that the blade 71 will tend to climb toward side 73 and thus remain on the pulleys. At the free end 75 of arm 50, we provide a clamp 76, which may be a set screw, so that a vertical arm 77 may be retained at various heights above platform P. The lower portion of 77 carries a pair of roller guides 78, 79, on a head 80, there being a set screw 81 for clamping the head at various angles to arm 77. The blade 71 passes between rollers 78, 79 in a well known manner and through suitable slots in split 12 between parts 10 and 11 of platform P.

Head 80, carrying roller guides 78, 79, may be rotated in either direction to close or widen the gap between rollers for different thicknesses of blades. For example as shown in Fig. 4 head 80 may be substantially horizontal in which case the gap between roller guides 78, 79 is at the maximum. When head 80 is rotated at an angle to the horizontal, as indicated in Fig. 2, the gap is reduced to place each roller in contact with an opposite side of the blade 71.

It will be noted that the motor M, operating pulleys 14, 16, 18, 19 and 21, the belts and shaper tool holder 22 and socket 23 of our device are all contained within housing H and below platform P. The band saw blade 71, may be adjusted to the proper tension by loosening set screw 62 and revolving set screw 56 until suitable tension is achieved. A guard such as 90, having an angle iron extension 91 may then be slid over the upper portion of the device if desired.

If the band saw is to be used, shaper tool 5 is removed from hole 24 and socket 23 of holder 22 and the electric switch 95 is moved to the "on" position. The vertical adjustment of socket 51 on post 30 by screw 56, not only moves upper pulley 70, but simultaneously moves the roller guides 78 and 79 a corresponding amount thus automatically keeping the roller guides at the preferred distance from the pulley. With the shaper tool removed from its socket, there is no danger of the operator being cut thereby while using the band saw.

If the shaper tool is to be used, the set screw 62 may be loosened and set screw 56 turned to lower arm 50 until rollers 78 or 79 strike platform P. The band saw blade 71 is thus not only removed from contact with lower pulley 18, as shown in Fig. 3, but is brought to a complete and positive stop by the inability of rollers 78 and 79 to revolve while in contact with platform P. The shaper tool may then be inserted, while the motor is stopped, and upon the motor being started, the shaper may be used without fear of injury to the operator from the band saw blade. The band saw blade such as 71 is normally of less thickness than the gap between rollers 78 and 79 and the head 80 is therefore normally inclined as indicated in Fig. 2 to bring each roller in contact with the blade. Thus the lowest roller 78 or 79 will contact the platform P first and be prevented from revolving thereby.

In shifting from the use of the shaper to the use of the band saw, or vice versa, it is therefore only necessary to insert or remove the shaper tool and to raise or lower the arm 50 of the band saw. It is not necessary to remove the work platform to gain access to the interior of the housing in order to change the power transfer mechanism nor is any complicated and expensive clutch necessary as in prior devices.

We claim:

In a band saw having a work platform; a lower pulley for the band saw blade located below the work platform and an upright cylindrical post projecting above the platform; the combination of an horizontal arm with an inverted cylindrical socket fitting around the upper portion of the post; a threaded member, adapted to raise and lower said horizontal arm on said post, projecting downwardly from the base of the socket and in threaded engagement with a first recess in the top of the post; a rod projecting downwardly from the socket base and in sliding engagement with a second recess in the top of the post; an upper pulley for the band saw blade revolubly mounted intermediate of said horizontal arm above the lower pulley; an adjustable clamp at the free end of said horizontal arm; a vertical arm mounted in said clamp, and a pair of band saw guide rollers, mounted at the lowermost end of said vertical arm, at least one of said rollers contacting the work platform when said horizontal arm is in its lower position on said post.

RALPH J. HOUTTE.
RUSSELL E. SCHWARZENBERG.

REFERENCES CITED

The following references are of record in the file of this patent:

UNITED STATES PATENTS

| Number | Name | Date |
|---|---|---|
| 1,482,013 | Jarvis | Jan. 29, 1924 |
| 1,700,702 | Kittle | Jan. 29, 1929 |

FOREIGN PATENTS

| Number | Country | Date |
|---|---|---|
| 197 651 | Great Britain | Apr. 3, 1924 |